(No Model.) 2 Sheets—Sheet 1.

A. McDONALD.
MACHINE FOR RABBETING, GROOVING, OR MOLDING STONE.

No. 307,865. Patented Nov. 11, 1884.

Witnesses:
L. N. Piper
E. B. Pratt

Inventor:
Alexander McDonald
by R. H. Eddy, atty.

(No Model.) 2 Sheets—Sheet 2.

A. McDONALD.
MACHINE FOR RABBETING, GROOVING, OR MOLDING STONE

No. 307,865. Patented Nov. 11, 1884.

Witnesses
S. N. Piper
C. P. Pratt

Inventor
Alexander McDonald
by R. H. Eddy atty.

UNITED STATES PATENT OFFICE.

ALEXANDER McDONALD, OF CAMBRIDGE, MASSACHUSETTS, ASSIGNOR TO THE McDONALD STONE CUTTING MACHINE COMPANY, OF NASHUA, NEW HAMPSHIRE.

MACHINE FOR RABBETING, GROOVING, OR MOLDING STONE.

SPECIFICATION forming part of Letters Patent No. 307,865, dated November 11, 1884.

Application filed June 17, 1884. (No model.)

*To all whom it may concern:*

Be it known that I, ALEXANDER McDONALD, of Cambridge, in the county of Middlesex, of the Commonwealth of Massachusetts, have invented a new and useful Improvement in Machines for Rabbeting, Grooving, or Molding Stone; and I do hereby declare the same to be described in the following specification and represented in the accompanying drawings, of which—

Figure 1:
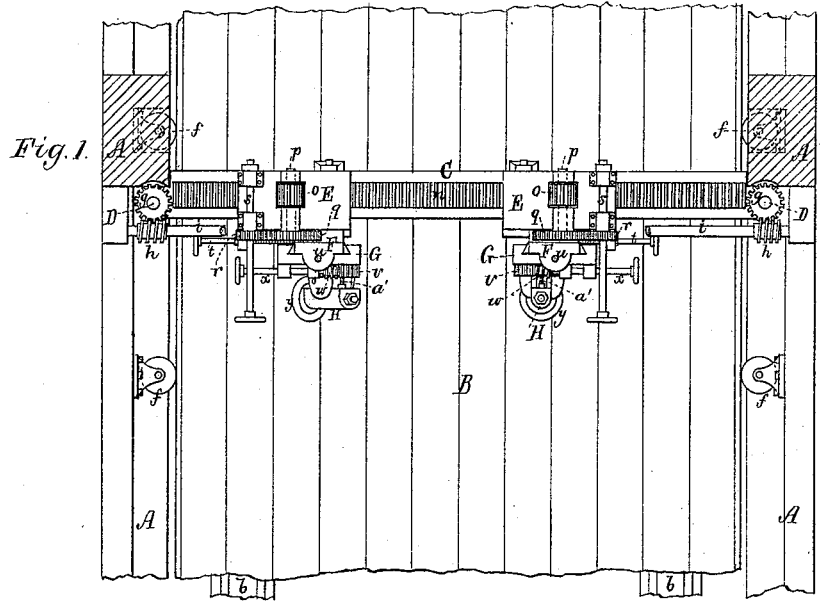
Figure 2:
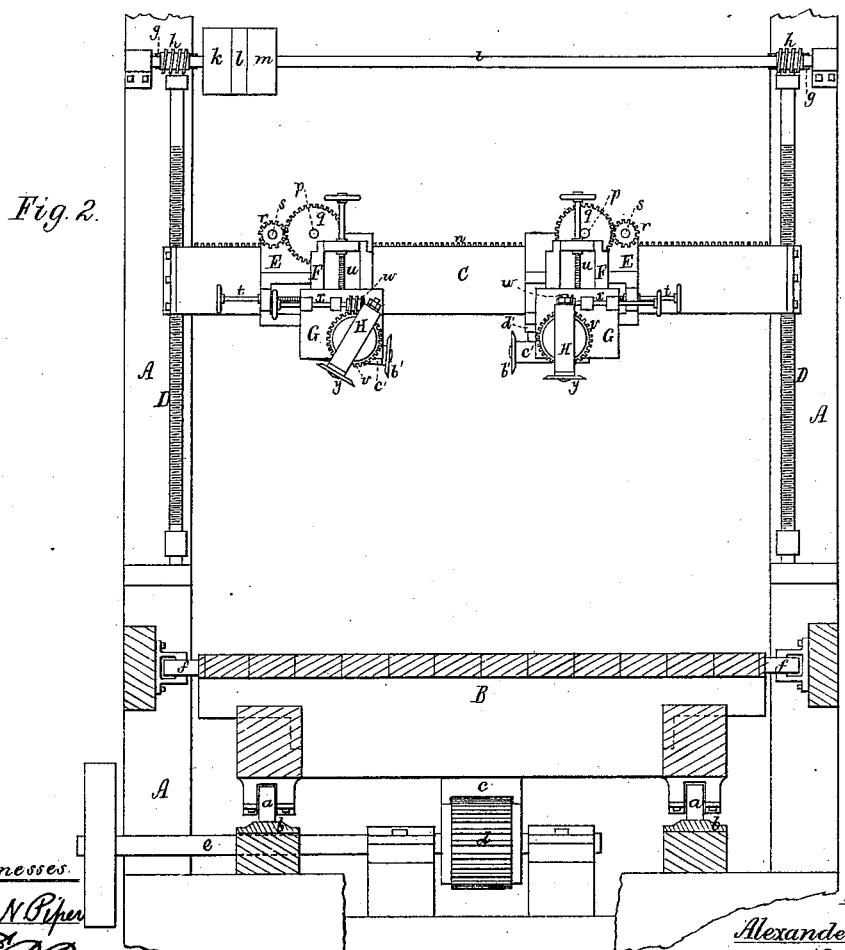
Figure 3:
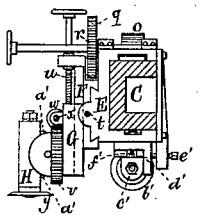
Figure 4:
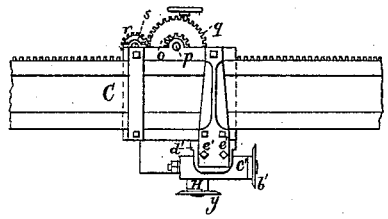
Figure 5:
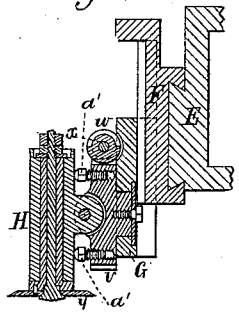
Figure 6:
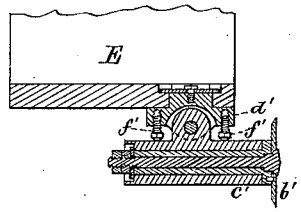
Figure 7:
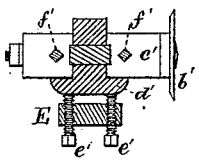

Figure 1 is a top view, and Fig. 2 an end elevation, of a machine containing my invention, the nature of which is defined in the claims hereinafter presented. Fig. 3 is a transverse section, and Fig. 4 a rear view, of a portion of the vertically-adjustable cutter-rail, such figures exhibiting two of the rotary disk cutters and their supporting and adjusting devices, to be described. Fig. 5 is a vertical and transverse section taken through the cutter-supporter H and its adjusting-screws $a'$ $a'$ and parts adjacent thereto. Fig. 6 is a vertical section taken through the axis of the auxiliary cutter supporter $c'$ lengthwise thereof and the revoluble carrier $d'$ of said supporter, such section showing the adjusting screws $f'$ $f'$, hereinafter explained. Fig. 7 is a horizontal section taken through the auxiliary cutter supporter $c'$ and its carrier $d'$, the carriage E, and the screws $e'$ $e'$, as described, for further adjusting the carrier $d'$.

In this machine the stone to be cut is supported on a carriage movable horizontally and rectilinearly under the cutters, which revolve and cut into the stone by contact with it while it is in movement. These cutters are disks of steel sharpened at their peripheries.

In the drawings, A denotes the frame for supporting the operative parts, there being within such frame the carriage B, for supporting the stone, such carriage being provided with wheels $a$ $a$, sufficient in number, and resting on the parallel rails $b$ $b$. A rack, $c$, fixed to the carriage at its middle, and extending lengthwise of it, engages with a pinion, $d$, carried on a horizontal shaft, $e$, which when revolved by suitable means will cause the pinion to act upon the rack in a manner to move the carriage rectilinearly lengthwise of it. This carriage at each of its opposite longer edges bears against a series of friction-wheels, $f$, properly supported in bearings applied to the frame A.

Above the carriage B is the adjustable and horizontal rail C, which is supported by two vertical screws, E D, that screw into and through it, and are sustained so as to be capable of being revolved on their axes, but incapable of being moved vertically. At its upper end each screw D has a worm-gear, $g$, to engage with one of two screws or worms, $h$, fixed on a horizontal shaft, $i$, provided with two loose pulleys, $k$ $m$, and an intermediate fast pulley, $l$. From a suitable driving-drum two endless belts are to pass to the said pulleys, one of such belts being a crossed belt, in order that when such belt may be on the pulleys $k$ and $l$ the shaft may be revolved in one direction, and in the opposite one when the belts are on the pulleys $l$ and $m$. By means of the screws D D the vertical distance of the rail C from the carriage may be increased or diminished, as circumstances may require. The rail C has on its upper edge a toothed rack, $n$, that extends along it lengthwise of it. Two carriages, E, embrace the rail, each being adapted to slide on it longitudinally of it. To each of them there is a pinion, $o$, whose shaft $p$ is journaled to the carriage. This pinion engages with the rack $n$. There is fixed on the said shaft $p$ a spur-gear, $q$, to engage with a pinion, $r$, arranged as shown, and fixed on a short shaft, $s$, journaled to the carriage. By revolving the shaft $s$ by a key or crank the carriage can be moved on the rail C, lengthwise thereof, in either of two directions. In front of each carriage E is a slide, F, which is adapted to the carriage so as to be capable of being slid horizontally thereon either toward or from the middle of the rail C. An adjusting-screw, $t$, suitably applied to the carriage and slide, serves to give motion to the latter.

To each slide F, on its front face, there is an auxiliary slide, G, which is adapted to the slide F so as to be capable of being moved vertically relatively thereto, there being to the two slides an adjusting-screw, $u$, for the purpose of effecting either an upward or a downward movement of the slide G.

In front of each slide G, and pivoted to it, is a worm-gear, v, having a screw, w, for revolving it, such screw being carried by a shaft, x, journaled to the slide G. By turning the shaft the worm-gear will be revolved. Pivoted to the worm-gear, so as to be capable of turning in a plane at right angles to the front face of the said gear, is the cutter-spindle supporter H, furnished at its lower end with a disk cutter, y, having its spindle duly pivoted within such supporter. The said supporter and worm-gear are furnished with one or more adjusting-screws, a', for setting the supporter more or less inclined relatively to the face of the worm-gear. Furthermore, to each carriage E there is an additional rotary disk cutter, b', which is arranged in or about in a vertical plane, the supporter c' of the spindle of the said cutter being pivoted at or near its middle to a carrier, d', so as to be capable of being turned in a vertical plane. This carrier is pivoted to the carriage E so as to be capable of being revolved or turned horizontally, such carriage being provided with two screws, e', to screw into it and bear against the carrier in a manner to so turn it more or less, and to hold it in position, one screw being first turned backward and the other next turned forward in order to cause a turning movement of the carrier. Furthermore, to adjust the supports into either a horizontal or inclined position there are two adjusting-screws, f', which screw into the carrier and against the supporter, all being as represented in the drawings.

Although I have shown two of the carriages E to the rail C, one only may be used, or there may be more than two, each being provided with disk-cutters and devices, as described, for adjusting each of them into different positions relatively to the face of a stone to be cut.

I am aware that it is not new to have to a stone-cutting machine a carriage for supporting and moving a stone along under a series of disk cutters, each of which, besides revolving on its own axis, has an orbital motion while in operation.

I am also aware that it is not new to have the stone stationary and the disk cutters to be supported by a carriage moved rectilinearly over the stone or by a rotary carrier revolved over such stone.

In my present machine the stone is movable by a carriage, and each of the disk cutters is adjustable, as described, in several planes, but when in operation is only revoluble on its axis and by contact with the stone, while the latter may be in movement under it.

I claim—

1. The combination of the carriage B, provided with mechanism for reciprocating it rectilinearly, the rail C, having mechanism for adjusting it vertically, the carriage E, applied to the said rail and having mechanism for moving it thereon lengthwise thereof, the slide F, applied to the said carriage so as to be movable laterally thereof, as described, and provided with mechanism for effecting such movement, the auxiliary slide G, applied to the slide F so as to be movable upward and downward thereon and having mechanism for effecting such movement, and the cutter-spindle supporter H, connected with the slide G so as to be turned in a plane parallel thereto or in one at right angles therewith, and provided with mechanism for effecting each of such movements, the said supporter having a disk cutter and its spindle, and all being to operate substantially and for the purpose as set forth.

2. The combination, substantially as described, for rabbeting, molding, or grooving a stone by means of two rotary disk cutters operating at the same time thereon, the said combination consisting of the carriage B, provided with mechanism for reciprocating it rectilinearly, the rail C, having mechanism for adjusting it vertically, the carriage E, applied to the said rail and having mechanism for moving (it the said carriage) on the said rail lengthwise thereof, the slide F, applied to the said carriage E so as to be movable laterally thereof, as described, and provided with mechanism for effecting such movement, the auxiliary slide G, applied to the slide F so as to be movable upward and downward thereon and having mechanism for effecting such movement, the cutter-spindle supporter H, provided with the rotary disk cutter y and its spindle, and connected with the slide G, so as to be revoluble in a plane parallel thereto or in one at right angles therewith, and provided with mechanism for effecting such movements, and the auxiliary rotary disk cutter b', its supporter c', and the revoluble carrier d', to which the supporter c' is pivoted, such supporter c' having adjusting-screws f', and such carrier d' being pivoted to the carriage E so as to be capable of being revolved or turned horizontally, and such carriage E being provided with the screws e' to bear against the carrier d', all being arranged and to operate essentially as set forth.

ALEXANDER McDONALD.

Witnesses:
R. H. EDDY,
E. B. PRATT.